Sept. 14, 1954     E. N. SILVERMAN     2,688,900
VARIABLE DENSITY SUNGLASS
Filed Feb. 16, 1951
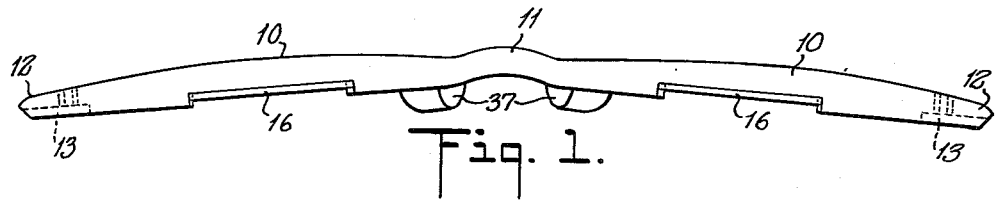
Fig. 1.
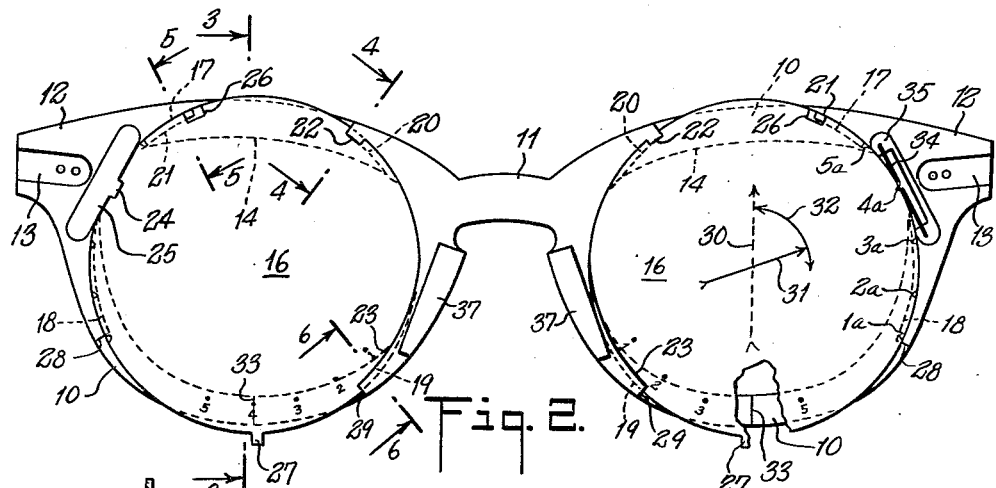
Fig. 2.
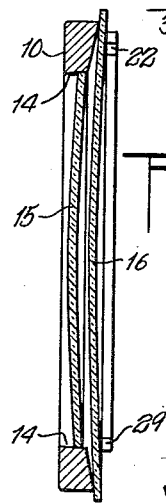
Fig. 3.
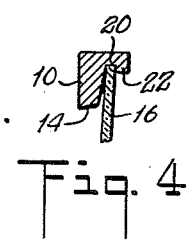
Fig. 4.
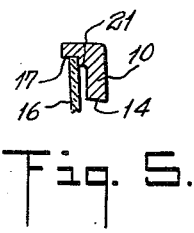
Fig. 5.
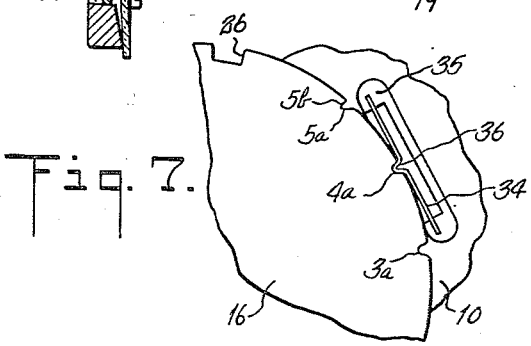
Fig. 6.
Fig. 7.
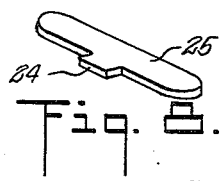
Fig. 8.
INVENTOR.
Eliot N. Silverman
BY
Kenyon & Kenyon
ATTORNEYS Patented Sept. 14, 1954

2,688,900

UNITED STATES PATENT OFFICE 2,688,900

VARIABLE DENSITY SUNGLASS

Eliot N. Silverman, Bayside, N. Y., assignor to
Pioneer Scientific Corporation, New York, N. Y.,
a corporation of New York Application February 16, 1951, Serial No. 211,210

10 Claims. (Cl. 88—41)

This invention relates to improvements in sunglass construction and relates especially to sunglass construction of the type employing a plurality of light polarizing lens elements disposed for successive transmission of light therethrough and wherein one light polarizing lens element is rotatable relative to another so that the intensity of the light transmitted successively therethrough may be varied.

Sunglasses have been extensively used to shield the eyes under conditions of excessive glare or brilliance of illumination. Light polarizing material is effective for this purpose. However, because conditions of glare or brilliance may vary considerably and because the eyes of different individuals may vary in their reaction to light, it has heretofore been proposed to employ in sunglass construction a plurality of light polarizing lens elements in an ophthalmic mounting with one of the lens elements rotatable relative to another so that the intensity of the light successively transmitted through the lens elements may be varied. For brevity sunglasses having such construction are referred to herein as variable density sunglasses.

Several types of variable density sunglass construction have been proposed. Some of such types have been relatively crude and because of their crudeness have been relatively unsatisfactory both in appearance and in use. Other types have been relatively intricate in construction and, therefore, relatively expensive. Moreover, regardless of construction variable density sunglasses have been relatively heavy in construction and frontally present round lens frames for holding round light polarizing lens elements. The heavy construction combined with the frontal round lens frames and lenses results in an unattractive goggle-like appearance which detracts seriously from consumer appeal except for possible industrial application where attractiveness of appearance is not a factor.

Other disadvantages of prior proposals for variable density sunglasses result from the dual lens construction. When the construction is such that one of the lenses cannot be removed or can be removed only with difficulty, drawbacks are encountered due to the tendency for dust particles to become lodged between the lenses; for when one of the lenses is rotatably mounted relative to the other the construction is inherently such as to permit eventual dust penetration that accumulates between the lenses in more or less degree depending on the construction employed. In such case if one of the lenses is not removable the sunglass eventually has to be discarded, and if one of the lenses can be removed, in the case of prior proposals, it is usually the case that special tools are required as well as services requiring special skill.

It is an object of this invention to provide improved sunglass construction which obviates or minimizes the drawbacks and disadvantages incident to prior proposals and which is simple and can be economically produced.

The improvements in variable density sunglass construction that have been effected according to this invention include several features which preferably are all employed in combination, but which may be employed individually or in subcombination so as to afford improvements in variable density sunglass construction to the extent that such features are employed.

One of the features and advantages of this invention resides in the provision of an ophthalmic mounting wherein the lens aperture in the lens frame and the surrounding frame are non-circular and suitably covered and contoured so that the sunglass may have an ornamental and attractive frontal appearance in relation to the features of the wearer. Thus, preferably the lens frame portion of the mounting is provided with a lens aperture that has substantially greater lateral extent than vertical extent. Carried in the lens frame is a first light polarizing lens element which may have its marginal contour correspond with the non-circular lens aperture in the lens frame and which is fixedly carried in the lens frame; and in combination therewith a second light polarizing lens element may be employed which may have a circular perimeter but whose round shape is concealed by the lens frame. Being of circular perimeter or having arcuate marginal portions the second light polarizing lens element may be rotationally mounted for rotation relative to the first non-circular light polarizing lens element.

It is a further feature and advantage of this invention that by the provision of a non-circular lens frame in combination with a first light polarizing lens element of corresponding marginal contour and a second light polarizing lens element of substantially circular contour, the margin of the second light polarizing element may protrude slightly beyond the outer margin of the lens frame at least at one region and preferably at oppositely disposed regions. When the margin of the second light polarizing element protrudes from the lens frame at oppositely disposed regions, opposite marginal portions of the second light polarizing lens element are disposed for manual contact and may be grasped between the thumb and forefinger so that rotational adjustments of the second light polarizing lens element relative to the first light polarizing lens element may be made much more conveniently than has been possible in connection with prior variable density sunglass constructions.

Another feature and advantage of this invention relates to the means for carrying the rotatably mounted light polarizing lens element in relation to a fixed light polarizing lens element. Such means preferably consists merely in recess means in the lens frame in back of the non-circular lens aperture and means for holding the lens element in the recess. Preferably such recess means also includes shoulder means whereby the rotatable lens element is essentially marginally carried so that the rotatable lens element is maintained in proximate spaced relation with respect to the fixed lens element thus avoiding scratching of the opposed surfaces of the lens elements and so that any surface scratching of the rotatable lens element against the bottom of the recess means in which it travels is minimized and confined to the extreme marginal portion of the rotatable lens element.

Another feature and advantage of this invention resides in the cooperative means between the lens frame and the rotatably carried light polarizing lens element whereby such lens element may be readily removed to permit cleaning of the lenses. Such means includes cooperation between the marginal contour of the rotatable lens element and retaining means presented by the lens frame whereby when the rotatable lens element is in a given position of rotation it may be removed simply by lifting it out. Preferably the removal position is such as to not be within the normal range of rotation of the rotatable lens element that is employed for controlling the intensity of light succesively transmitted through the light polarizing lens elements. Preferably also the rotatable position of the rotatable lens element at which removal of the lens element may be effected is controlled by stop means, and preferably also means are afforded so that in rotating the rotatable lens element to the removal position increased resistance to rotation will be encountered shortly prior to obtainment of the rotational position of the lens element at which its removal may be effected. A further advantage of the means whereby the rotatable lens element may be removed resides in the fact that such removal is permitted without use of special tools and can be readily accomplished by the owner without danger of scratching or of dirtying the lens surfaces.

Further features and advantages of this invention relate to the means for providing indexing indicia such as numbering whereby equalization of the light transmission as between the two sides of the sunglass may be effected in a manner that is readily apparent to the user and that is afforded by the novel construction. Moreover, means are afforded whereby certain selected rotational positions of the rotatable lens element may be frictionally maintained by the cooperation between resilient detent means and marginal notches in the rotatable lens element, such positions preferably being correlated to the indexing indicia. Moreover, further features of this invention relate to the provision of resilient detent means of such construction that there is no danger of the detent means falling out or becoming crushed or jammed when the rotatable lens element is removed.

More generally the aforesaid features and advantages are provided while at the same time the sunglass construction is simpler than prior proposals in that there may be only two movable parts, i. e., the rotatable light polarizing lens elements, while the rest of the construction may consist simply of the fixed light polarizing lens elements and the frame. Because of the simplicity and the few parts required, the improved sunglasses can be produced at materially reduced cost.

Further objects, features and advantages of this invention will be apparent in connection with the following description of a typical embodiment of this invention which has been shown for illustrative purposes in the accompanying drawings, wherein Fig. 1 is a top view of a typical sunglass embodying this invention, with the temples omitted;

Fig. 2 is a back view of the sunglass shown in Fig. 1 with one of the cover pieces for the detent-carrying spring member removed;

Fig. 3 is a section taken on the line 3—3 of Fig. 2;

Figs. 4, 5 and 6 are sections taken on the lines 4—4, 5—5, and 6—6 respectively of Fig. 3 with the fixed light polarizing lens element removed;

Fig. 7 is an enlarged detail view of a portion of one of the rotatably mounted light polarizing lens elements showing certain of the marginal notches therein in relation to the detent-carrying spring member; and Fig. 8 is an enlarged perspective view of one of the cover pieces for the detent-carrying spring member.

In the sunglass shown in the drawings there are two lens frames 10 that are joined by a bridge 11 and that carry at their outer extremities the hinge holding parts 12 which contain the hinge receiving recesses 13 in which hinges may be secured for attachment to any suitable type of temples (not shown). The lens frames 10 also present the conventional nose pieces 37.

The principal features of this invention relate to the lens frame construction and the means associated therewith including the light polarizing lens elements carried thereby, and since each of the lens frames and the means associated therewith are the same except for their complementary relationship the following description is applicable to each of the individual lens frames and parts associated therewith, and like reference characters have been applied to both.

It is to be noted that the lens frame 10 is non-circular in that it is ornamentally curved so that the lens aperture provided therein of a generally oblate shape having substantially greater lateral extent as compared with vertical extent. One of the light polarizing lens elements 15 whose marginal contour or perimeter corresponds to that of the lens aperture 14 is fixedly carried in the lens aperture 14 in any desired way as by the employment of a cement or a friction fit.

The other light polarizing lens element 16 is rotatably and removably carried in the lens frame 10 in the following way. The back portion of the frame 10 is provided with recess means adapted to receive the lens element 16 so that the lens element 16 may be rotated therein relative to the lens element 15. The recess means comprises the recesses 17, 18, 19 and 20 whose side walls are arcuate and form part of a common circle corresponding in diameter with the diameter of the substantially circular perimeter of the lens element 16 but with a slight clearance provided so that the lens element 16 may be freely rotated when received in the aforesaid recesses. Preferably the arcuate side walls of these recesses merge with the lens aperture 14 in the regions of the lens frame adjacent the nose piece 37 and the hinge-carrying part 12 although such construction is not essential. However, it is to be noted in the construction shown that the diameter of the lens element 16 is substantially the same as the maximum dimension of the lens element 15, and such construction is preferable.

In the construction shown it is also to be noted that the diameter of the lens element 16 is slightly greater than the outside vertical dimension of the lens frame 10 and that the lens element 16 as carried by the recess means protrudes slightly from the top and bottom of the frame 10 so as to be accessible for manual contact. This is a desirable feature of this invention for the protruding margins of the lens element 16 can be grasped between the thumb and forefinger in a way such that accurate and smooth adjustments of the rotational position of the lens element 16 are greatly facilitated. While this is a valuable feature of this invention such protrusion of the lens element 16 beyond the outside margins of the frame 10 is not essential. Thus, depending on the relative dimensions of the frame 10 and the lens element 16, the lens element 16 may protrude from the frame 10 only at one point or even at no point. When the lens element 16 does not protrude at any point from the frame 10 some other means for manually rotating the lens element 16 may be provided such as the tab 27 that is either integral with or attached to the lens element 16 so that the tab may protrude from the frame 10 sufficiently to permit manual contact for rotating the lens element 16. In the embodiment shown the tab 27 is used primarily as part of stop means for imposing limits on the rotational movement of the lens element 16, as will be described more in detail hereinbelow, but such tab could be used for manually rotating the lens element 16 if the lens element 16 does not otherwise protrude from the frame 10.

The bottom of the recess means in which the lens element 16 is carried is such that the lens element 16 is maintained in proximate spaced relation to the lens element 15 so that when the lens element 16 is rotated there will be no rubbing or scratching of the opposed surfaces of the lens elements 15 and 16. The bottom of the recess means as well as the other portions of the frame 10 that make contact with the lens element 16 are inclined or otherwise shouldered so that the only contact that the surface of the lens element 16 makes with the lens frame 10 is immediately adjacent the perimeter of the lens element 16. Thus, as shown in Fig. 3 the portion of the lens frame 10 that supports the lens element 16 is inclined or otherwise shouldered inwardly away from the surface of the lens element 16. The same is the case as regards the sectional views shown in Figs. 4 and 6. In Fig. 5 the same effect is provided by the narrow shoulder 21, and a similar shoulder may be provided at the bottom of the recess 19. In this way notwithstanding that the lens element 16 overlies substantial areas of the lens frame 10 contact of the surface of the lens element 16 with the lens frame is confined to the extreme marginal portion of the surface of the lens element 16 facing the lens element 15 so that any scratching of this surface of the lens element 16 occasioned by rotation of the lens element 16 is confined to this extreme marginal portion of the surface of the lens element 16.

The lens element 16 is retained in the recess means in which it is rotatably carried by small overlying retaining members that are either integral with or fixedly carried by the frame 10. In the embodiment shown there are three such overlying retaining members. One of these members is provided by the lug 22 which overlies the recess 20 as shown in Figs. 2 and 4 thereby retaining the margin of the lens element 16 within the recess 20. As shown in Figs. 2 and 6 the retaining member 23 overlies the recess 19, and while this retaining member is shown as somewhat elongated a shorter lug such as the lug 22 would serve a similar purpose. The third of these retaining members is provided by the lug 24 which protrudes from the spring cover piece 25 that is fixedly carried by the frame 10. These overlying retaining members effectively retain the lens element 16 in the recess means in which the lens member 16 is rotatably carried.

The lens member 16 may be readily removed from the recess means in which it is normally rotatably carried by providing a notch in the margin of the lens element 16 that is adapted to clear one of the overlying retaining members when the lens member is in a given rotational position at which the notch registers with the overlying member that it is adapted to clear. In the embodiment shown the lens element 16 is provided with the notch 26 that is so proportioned as to clear the lug 24 of the cover piece 25 that otherwise overlies the margin of the lens element 16. Since the other overlying retaining members 22 and 23 are disposed oppositely to the lug 24 it is apparent that when the notch 26 has been brought into registration with the lug 24 the marginal portion of the lens element 16 disposed in the recesses 17 and 18 may be lifted therefrom so that the opposite margin of the lens element 16 may be moved out from under the retaining members 22 and 23, thus permitting bodily removal of the lens element 16 from the frame 10. To replace the lens element 16 all that is required is to slide the margin of the lens element 16 underneath the retaining members 22 and 23, pass the notch 26 over the lug 24 and then turn the lens element 16 so as to lock it in place. These operations may be quickly and easily performed and it is to be noted that no tools are required and that the operation can be carried out while grasping the margins only of the lens element 16 thus avoiding any dirtying or scratching of the lens element.

While the lens element 16 may be mounted so that it may be freely rotated through 360° it is normally preferable to provide means whereby rotation limits may be imposed within which desired effective variations in intensity of light transmission may be afforded. As between two such light polarizing lens elements maximum variations in intensity of light transmission is afforded by rotation of the rotatable lens element relative to the fixed lens element through 90°. For reasons explained below the stop means of the embodiment shown imposes limits of rotation of the lens element 16 somewhat in excess of 90°, e. g., about 110°.

The stop means of the embodiment shown is provided by the tab 27 that is shown as integral with the margin of the lens element 16 (but which may be attached thereto if desired) and by the abutments 28 and 29 against which the tab 27 strikes so as to prevent further rotation of the lens element 16 in either direction. In Fig. 2 arrows have been shown associated with the lens elements 15 and 16. These arrows are intended to illustrate the polarizing axes of the lens elements. Thus, the longer vertical arrow 30 shown as a dotted line is the polarizing axis of the fixed lens element 15, i. e., the lens element 15 is adapted to transmit light vibrating only in a vertical plane. The shorter arrow 31 shown as a solid line indicates the polarizing axis of the lens element 16 when the lens element 16 is in such position that the tab 27 is in the intermediate position shown between the stops 28 and 29. The arcuate arrow 32 indicates 90° of rotational movement of the polarizing axis of the lens element 16 between the position of maximum light transmission through the lens elements 15 and 16 and minimum light transmission. When the polarizing axis of the lens element 16 is parallel to that of the lens element 15 maximum light transmission occurs and conveniently the tab 27 is so positioned relative to the abutment 28 that the tab 27 will be in contact with the abutment 28 when the polarizing axes of the lens elements 15 and 16 are parallel so as to facilitate such setting of the rotational position of the lens element 16.

Upon rotating the lens element 16 so as to move the tab 27 toward the abutment 29 until the polarizing axis of the lens element 16 is at a 90° angle to that of the lens element 15 minimum light transmission occurs. In the embodiment shown this occurs before the tab 27 contacts the abutment 29 and when the indicia "5" carried on the margin of the lens element 16 overlies the mark 33 on the frame 10 that is visible through the lens element 16. When, in the embodiment shown, the lens element 16 is further rotated until the tab 27 contacts the abutment 29 then the marginal notch 26 in the lens element 16 is brought into registration with the lug 24 of the cover piece 25 so that the lens element 16 may be removed from the recess means in the frame 10 as hereinabove described. In this way the rotational position of the lens element 16 at which it may be removed from the frame 10 or replaced therein may be automatically and positively determined so that such removal or replacement is greatly facilitated. Moreover, it is to be noted that this rotational position at which removal of the lens element 16 can be effected is outside the range of the normal rotational movement of the lens element 16 in adjusting variations in light intensity so that within the normal range of rotational movement of the lens element 16 there is no danger of accidental separation of the lens element 16 from the frame 10.

In addition to the indicia "5" marginally presented on the lens element 16 other indexing indicia may be employed at any convenient spacing which may be desired and in the embodiment shown the indicia "1," "2," "3," and "4" have been shown for illustrative purposes. These indicia may be successively brought into registration with the mark 33 on the frame 10 and since the indicia for the lens elements in each of the lens frames of the sunglass are complementary the indexing means enables the user to make corresponding and equalized settings of the lens elements in the respective frames very accurately and with maximum convenience. If desired the numerical indicia could be presented by the frame 10 and the mark by the lens element 16.

In either case a novel indexing arrangement is afforded due to the fact that the margin of the lens element 16 overlies a surface of the frame 10 so that a mark or other indicia presented by the frame is visible through the lens element 16 and so that a mark or other indicia marginally presented by the lens element 16 may be brought into visible registration with the mark or other indicia presented by the frame.

In order to further facilitate the setting of the the rotational position of the lens element 16 relative to the lens element 15 means may be provided for normally retaining the lens element 16 in a number of predetermined selected rotational positions. For this purpose a plurality of small marginal notches may be provided in the lens element 16 for co-action with a detent resiliently carried by the frame 10. As shown at the right hand side of Fig. 2 and on a larger scale in Fig. 7, the detent means consists of a spring 34 whose ends are carried in notches in the insert piece 35 which is hollowed out so that the spring member 34 is carried in substantially spaced relation to the back inner surface of the insert piece 35, thus permitting substantial inward flexure of the spring 34 away from the margin of the lens element 16. There is a detent 36 centrally disposed on the spring member 34 which is normally urged against the margin of the lens element 16 for entry into the marginal notches of the lens element 16. These notches have been indicated by the reference characters 1a, 2a, 3a, 4a, and 5a and these notches in the embodiment shown come into registration with the detent 36 when the indicia "1," "2," "3," "4" and "5" respectively come opposite the mark 33 on the frame 10. The coaction between the detent 36 and the marginal notches of the lens element 16 serves to frictionally maintain the rotational position of the lens element 16 against accidental displacement but permits manual adjustment of the rotational position of the lens element 16. This is of advantage in normal use of the sunglass. A further advantage of the construction resides in the fact that the resilient detent means is such that when the lens element 16 is removed from the frame 10 the resilient detent means will not fall out. Moreover, in removing and replacing the lens element 16 there is no danger of crushing or jamming the resilient detent means. In assembly the insert piece 35 may be secured in place in a corresponding recess in the frame 10 as by use of a cement and the ends of the spring can be readily placed in the notches in the insert piece. The spring can be retained in place by thereafter cementing the cover piece 25 over the insert piece 35.

As pointed out above when the indexing number "5" is in registration with the mark 33 of the frame, the polarizing axis of the lens element 16 is disposed at 90° to the polarizing axis of the lens element 15. This corresponds to the limit of normal rotational movement of the lens element 16 relative to the lens element 15 at which light transmission is at a minimum. When the lens element 16 is in this position the detent 36 will become inserted in the marginal notch 5a in the lens element 16. As shown particularly in Fig. 7 the side wall 5b of the notch 5a is more abruptly inclined as compared with the other side wall of notch 5a and as compared with the side walls of the notches 1a, 2a, 3a and 4a. Because of the more abrupt inclination of the side wall 5b of the notch 5a substantially greater rotational force must be applied in causing the lens element 16 to be rotated so that the detent 36 will pass beyond the notch 5a in the direction toward the marginal notch 26 in the lens element 16. This is desirable in that in normal operation the rotational adjustment of the lens element 16 will be confined within the 90° rotational range of normal use within which the lens element 16 cannot be removed from the frame 10. In other words an extra rotational effort must be exerted in order to effect further rotation of the lens element 16 so that the notch 26 will come into registration with the lug 24 of the cover piece 25 so as to permit removal of the lens element 16 from the frame 10. In this way inadvertent rotation of the lens element 16 to the position at which the lens element 16 may be removed from the frame 10 and at which accidental falling out of the lens element 16 might occur, is effectively minimized responsive to the "feel" incident to making manual rotational adjustments of the lens element 16 relative to the lens element 15.

While reference has been made to light polarizing lens elements it is to be understood that normally the lens elements merely exert a polarizing effect on light transmitted therethrough and do not exert a correctional effect on transmitted light such as that exerted by the lenses of ordinary eyeglasses which are designed to compensate for deviations from normal vision. However, either or both the lens elements may include correctional characteristics if this should be desired.

Any suitable type of light polarizing lens element may be employed and suitable materials for use as the lens elements are well known. Thus the material for the light polarizing lens elements may be either of the laminated type or of the coated type and preferably is such as to provide relatively thin and light weight lens elements. For example, a suitable material for the lens elements may be of the molded laminated type which comprises a central layer in the form of a thin sheet of a molecularly oriented polyvinyl alcohol having incorporated therewith a dichroic light polarizing material comprising iodine. The outer layers of the lamination may advantageously be in the form of thin sheets of plastic such as cellulose acetate butyrate and, if desired, resistance to scratching may be increased by coating the exposed surfaces of the outer layers using a suitable coating such as a thin film of a polymerized alkyd-modified melamine formaldehyde resin. Such a lamination may be produced so as to be thin and light weight and if desired may be molded so as to have the standard six base curve imparted thereto. Alternatively the light polarizing lens elements may be provided by a suitable polarizing coating applied on thin glass or plastic material with the coating protected by a suitable varnish or lacquer.

While this invention has been described in connection with a specific embodiment thereof it is to be understood that this has been done for purposes of illustration and that the specific construction shown may be varied according to the principles of construction that have been described and illustrated hereinabove.

I claim:

1. In a variable density sunglass comprising a pair of lens frames connected by a bridge portion, each lens frame being comprised in an ophthalmic mounting for first and second light polarizing lens elements mounted therein for successive transmission of light therethrough and adapted for varying the intensity of so-transmitted light by rotation of one of said lens elements relative to the other, the combination wherein the lens frame comprised in each said mounting presents a non-circular curved lens aperture having substantially greater lateral extent than vertical extent and which comprises in combination with said lens frame a first light polarizing lens element whose perimeter corresponds to that of said aperture and is carried therein in fixed relation to said aperture, substantially arcuate recesses in said frame in back of said aperture and adjacent the lateral margins of said aperture, a second light polarizing lens element having a substantially circular perimeter rotatably disposed in said recesses with the upper and lower margins thereof protruding from said frame for manual contact in making rotational adjustments of said second light polarizing element relative to said first light polarizing lens element, retaining means carried by said frame for retaining said second light polarizing lens element in said recesses including a lug normally overlying the circular perimeter of said second light polarizing lens element and retaining member means overlying said circular perimeter disposed oppositely to said lug and in substantially spaced relation thereto, a release notch in the perimeter of said second light polarizing lens element adapted to be brought into registration with said lug upon rotation of said second light polarizing lens element and to clear said lug when said release notch is in registration with said lug thereby permitting removal of said second light polarizing lens element from said frame, and shoulder means between said aperture and the bottom of said recesses for maintaining said second light polarizing lens element in adjacent spaced relation to said first light polarizing lens element.

2. In a variable density sunglass as defined in claim 1 the combination according to claim 1 which includes stop members interposed between said second light polarizing lens element and said frame which afford fixed limits for permitted rotational movement of said second light polarizing lens element and which permit rotational movement of said second light polarizing lens element substantially in excess of a 90° range from a position with its polarizing axis substantially parallel to the light polarizing axis of said first light polarizing lens element to a position with its light polarizing axis at a 90° angle with respect to the light polarizing axis of said first light polarizing lens element, wherein said lug is in registration with said release notch when the rotational position of said second light polarizing lens element is adjacent to but substantially outside of said 90° range, which includes a plurality of spaced positioning notches along a portion of the perimeter of said second light polarizing lens element and a resiliently maintained detent carried by said frame adapted for frictional engagement with said positioning notches upon rotation of said second light polarizing lens element between the limits of rotation imposed by said stop members, wherein one of said positioning notches is located for cooperation with said detent when said second light polarizing lens element is at one of the extremities of said 90° range that is adjacent to but substantially removed from the rotational position of said second light polarizing lens element at which said lug is in registration with said release notch, wherein the configuration of said positioning notch is such as to require substantially increased rotational effort to rotate said second light polarizing lens element beyond said extremity of said 90° range for bringing said release notch into registration with said lug as compared with that required for rotational movement of said second light polarizing lens element between the extremities of said 90° range, wherein a marginal portion of said second light polarizing lens element overlies a portion of said frame with said frame visible therethrough, and which comprises cooperating indexing indicia respectively presented by the portion of said frame visible through said second light polarizing lens element and by said margin of said second light polarizing lens element, elements of said indicia being in registration when said detent is in frictional engagement with said positioning notches in the margin of said second light polarizing lens element.

3. A variable density sunglass which comprises a pair of lens frames connected by a bridge portion and in combination with each of said lens frames, a first light polarizing element carried in fixed relation to said lens frame, a second light polarizing lens element, and means for rotatably carrying said second light polarizing lens element by said lens frame and for permitting ready removal of said second light polarizing lens element therefrom, said means comprising a marginal notch in said second light polarizing lens element, a lug carried by said lens frame adapted to normally overlie the margin of said rotatably mounted lens element to hold said lens element between said lug and said lens frame, and retaining members carried by said lens frame adapted to normally overlie marginal portions of said second light polarizing lens element opposite to said lug to retain said lens element between said retaining members and said lens frame, said notch in said second light polarizing lens element being adapted to be brought into registration with said lug upon rotationally adjusting the position of said second light polarizing lens element and being adapted when in said position of registration to permit passage of said notch over said lug for removal of said second light polarizing lens element from said frame.

4. A variable density sunglass according to claim 3 which comprises means for increasing the resistance to rotation of said second light polarizing lens element when said rotational position of registration of said notch with said lug is approached, said means comprising a marginal notch in said second light polarizing lens element and a part carried by said lens frame in a given position relative thereto and adapted to coact with said notch when said notch is moved thereby to provide said increased resistance to the rotation of said second light polarizing lens element.

5. A variable density sunglass which comprises a pair of lens frames connected by a bridge portion and in combination with each of said lens frames a first light polarizing lens element carried in fixed relation to said lens frame, a second light polarizing lens element, a recess comprised in said lens frame within which said second light polarizing lens element is rotatable through approximately 90° between positions affording substantially maximum and substantially minimum transmission of light successively through said first and second light polarizing lens elements, and retaining means for retaining said second light polarizing lens element in said recess, said retaining means comprising spaced retaining members carried by said frame which overlie marginal portions of said second light polarizing lens element to retain said second light polarizing lens element in said recess when said second light polarizing lens element is in all positions of rotation at and between said positions affording substantially maximum and substantially minimum transmission of light and including a marginal notch in said second light polarizing lens element disposed for registration with one of said retaining members upon further rotation of said element and adapted to clear said retaining member when in registration therewith for permitting removal of said second light polarizing lens element from said frame.

6. A variable density sunglass according to claim 5 which comprises stop means for imposing limits on the rotational movement of said second light polarizing lens element relative to said frame, one of the limits imposed by said stop means being that whereat said retaining member is in registration with said notch in said second light polarizing lens element for permitting removal of said second light polarizing lens element from said frame.

7. A variable density sunglass which comprises a pair of lens frames connected by a bridge portion and in combination with each of said lens frames a first light polarizing lens element mounted in fixed relation to said lens frame, a second light polarizing lens element having a substantially circular periphery rotatably mounted in recess means comprised in said lens frame, means carried by said lens frame for rotatably retaining said second light polarizing lens element in said recess means including a retaining lug and retaining member means disposed in substantially spaced and opposed relation to said lug, said lug and said retaining member means normally overlying the circular periphery of said second light polarizing lens element, a marginal release notch in the periphery of said second light polarizing lens element adapted to register with said lug upon rotation of said second light polarizing lens element and through which said lug may be passed to permit removal of said second lens element from said recess, a plurality of positioning notches in the periphery of said second light polarizing element which are of lesser size than that of said release notch and through which said lug cannot be passed and a resiliently mounted detent carried in said frame for frictional co-action with said positioning notches.

8. A variable density sunglass comprising a pair of lens frames connected by a bridge portion, each of said lens frames being of substantial width and of substantially greater lateral extent than vertical extent and having a frontal aperture therein of substantially greater lateral extent than vertical extent and having in combination therewith, a first light polarizing lens element of substantially greater lateral extent than vertical extent carried in fixed relation to said lens frame in said frontal aperture, a second light polarizing lens element having a substantially circular periphery carried by said lens frame in rotatable relation thereto and to said first light polarizing lens element with a laterally disposed portion of the margin thereof overlying a laterally disposed portion of said lens frame of substantial width that is visible therethrough, and cooperating indexing indicia respectively presented by said portion of said lens frame visible through said second light polarizing lens element and by said margin of said second light polarizing lens element and adapted to be brought into registration at a plurality of different rotational positions of said second light polarizing lens element relative to said frame.

9. A variable density sunglass comprising a pair of lens frames connected by a bridge portion, each lens frame being of substantial width and having substantially greater lateral extent than vertical extent surrounding a frontal aperture of generally oblate shape having substantially greater lateral extent than vertical extent, and said lens frame having in combination therewith a first light polarizing lens element, the peripheral contour of which has substantially greater lateral extent than vertical extent and which is disposed in said aperture in fixed relation thereto, a second light polarizing element disposed behind said first lens element which has a substantially circular periphery whose diameter is substantially greater than the vertical width of said first lens element and which has a marginal portion of substantial width that protrudes vertically beyond the margin of said first lens element, said portion of said second lens element which protrudes vertically beyond the margin of said first lens element, said portion of said second lens element which protrudes vertically beyond the margin of said first lens element being substantially entirely disposed behind said lens frame so as to be masked thereby when the frame is viewed from in front and comprising manually actuatable means that extends substantially beyond the outer margin of said lens frame and that is adapted for manual actuation to rotate said second lens element relative to said lens frame and to said first lens element, and mounting means for rotatably mounting said second light polarizing lens element for rotation relatively to said lens frame and to said first lens element, said mounting means comprising laterally spaced retaining-member means fixed to said lens frame which are adapted to cooperate with laterally disposed portions of the periphery of said second light polarizing lens member for retaining said second lens member disposed as aforesaid in said rotatable relation to said lens frame and to said first lens element.

10. A variable density sunglass comprising a pair of lens frames connected by a bridge member, each lens frame being of substantial width and having substantially greater lateral extent than vertical extent surrounding a frontal aperture of generally oblate shape having substantially greater lateral extent than vertical extent and having in combination therewith a first light polarizing lens element of generally oblate shape having substantially greater lateral extent than vertical extent, the peripheral contours of which correspond to those of said aperture and which is held in fixed relation to said lens frame, a second light polarizing lens element disposed behind said first lens element which has a substantially circular periphery whose diameter is approximately the same as the maximum lateral dimension of said first lens element and is substantially greater than the maximum vertical dimension of said first lens element and which has a marginal portion of substantial width that extends substantially above the upper margin of said first lens element and a marginal portion of substantial width that extends substantially below the lower margin of said first lens element, said marginal portions of said second lens element which protrude beyond the upper and lower margins of said first lens element being substantially entirely disposed behind said lens frame so as to be masked thereby when the frame is viewed from in front and comprising manually actuatable means that extends beyond the outer margin of said lens frame and that is adapted for manual actuation to rotate said second lens element relative to said lens frame and to said first lens element, and mounting means for rotatably mounting said second lens element for rotation behind said first lens relative thereto and to said lens frame, said mounting means comprising arcuately disposed guide means which are recessed in the back of said lens frame and behind said aperture so as to be masked by said lens frame when said frame is viewed from in front and positions said second lens element in closely contiguous but at least appreciably spaced relation to said first lens element, which contact the periphery of said second lens element in the region of each laterally disposed end portion of said lens frame, and which are substantially spaced from each other where said manually actuatable means extends from said second lens element substantially beyond the outer margin of said lens frame, and means secured to said lens frame and coacting with said second lens element adjacent the periphery thereof in said regions of said recessed guide means for retaining said second lens element disposed as aforesaid in said rotatable relation to said lens frame and to said first lens element.

References Cited in the file of this patent

UNITED STATES PATENTS

| Number | Name | Date |
| --- | --- | --- |
| 1,401,327 | Erhard | Dec. 27, 1921 |
| 1,735,021 | Stewart | Nov. 12, 1929 |
| 2,251,330 | Fairbank | Aug. 5, 1941 |
| 2,422,287 | Bernheim et al. | June 17, 1947 |